(12) United States Patent
Romero

(10) Patent No.: US 6,937,983 B2
(45) Date of Patent: Aug. 30, 2005

(54) METHOD AND SYSTEM FOR SEMANTIC SPEECH RECOGNITION

(75) Inventor: Juan Rojas Romero, Valencina de la Concepcion (ES)

(73) Assignee: International Business Machines Corporation, Armonk, NY (US)

(*) Notice: Subject to any disclaimer, the term of this patent is extended or adjusted under 35 U.S.C. 154(b) by 587 days.

(21) Appl. No.: 09/977,665

(22) Filed: Oct. 15, 2001

(65) Prior Publication Data

US 2002/0111803 A1 Aug. 15, 2002

(30) Foreign Application Priority Data

Dec. 20, 2000 (EP) ............................................. 00480123

(51) Int. Cl.[7] .............................................. G10L 15/22
(52) U.S. Cl. ...................... 704/257; 704/252; 704/254; 704/256
(58) Field of Search ................................ 704/252, 254, 704/256, 257

(56) References Cited

U.S. PATENT DOCUMENTS

| | | | | |
|---|---|---|---|---|
| 5,642,519 A | * | 6/1997 | Martin | 704/9 |
| 5,675,706 A | * | 10/1997 | Lee et al. | 704/256 |
| 5,797,123 A | * | 8/1998 | Chou et al. | 704/256 |
| 6,006,221 A | * | 12/1999 | Liddy et al. | 707/5 |
| 6,292,771 B1 | * | 9/2001 | Haug et al. | 704/9 |
| 6,292,778 B1 | * | 9/2001 | Sukkar | 704/256 |
| 6,374,217 B1 | * | 4/2002 | Bellegarda | 704/240 |
| 6,401,061 B1 | * | 6/2002 | Zieman | 704/10 |

* cited by examiner

Primary Examiner—Susan McFadden
(74) Attorney, Agent, or Firm—Akerman Senterfitt

(57) ABSTRACT

The present invention discloses a computer-implemented method to understand queries or commands spoken by users when they use natural language utterances similar to those that people use spontaneously to communicate. More precisely, the invention discloses a method that identifies user queries or commands from the general information involved in spoken utterances directly by the speech recognition system, and not by a post-process as is conventionally used. In a phase of preparation of the system, a vocabulary of items representing data and semantic identifiers is created as well as a syntax module having valid combinations of items. When the system is in use, a user utterance is first discretized into a plurality of basic speech units which are compared to the items in the vocabulary and a combination of items is selected according to the evaluation from the syntax module in order to generate the most likely sequence of items representative of the user utterance. Finally the semantic identifiers and the data extracted from the user utterance are used to call the appropriate function that process the user request.

36 Claims, 3 Drawing Sheets

METHOD AND SYSTEM FOR SEMANTIC SPEECH RECOGNITION

CROSS-REFERENCE TO RELATED APPLICATIONS

This application claims the benefit of European Application No. 00480123.9, filed Dec. 20, 2000 at the European Patent Office.

BACKGROUND OF THE INVENTION

1. Technical Field

The present invention relates to a speech recognition system, and more particularly, to performing Natural Language Understanding functions by directly identifying the semantic information and other information derived from a spoken utterance.

2. Description of the Related Art

Generally, conventional speech recognition systems that perform Natural Language Understanding (NLU) functions operate in two main sequential stages. In a first stage, a speech recognition unit translates speech into text which contains a transcription of a user utterance. In a second stage, a specific NLU unit reads this text having a sequence of words which have been recognized in the first stage. The NLU system then can generate the information required to process the speech.

Prior art NLU techniques have been based on this two-stage process which operates at the word level. The process compares the words of the uttered speech to words previously stored in a word vocabulary. Accordingly, conventional NLU systems require specific NLU units and associated computer resources to process a text input.

SUMMARY OF THE INVENTION

The invention disclosed herein provides a novel and more efficient way to operate a speech recognition system for Natural Language Applications wherein the specific Natural Language unit and associated computer resources are no longer required. The new speech recognition system can accept Natural Language utterances as input and directly generate the information required to process a user request.

Therefore, it is an object of the present invention to provide a system and method for operating a speech recognition system within Natural Language applications. Another object of the present invention is to provide a system and method which facilitates easy building of applications using limited computer resources. The invention disclosed herein further can offer improved response times. Accordingly, the invention can be used with embedded systems or in digital signal processing systems. Yet another object of the present invention is to provide a speech recognition system and method to be used in multilingual applications and for applications that should be translated to other languages.

The accomplishment of these and other related objects can be achieved by a system and method which configures a speech recognition system to accept natural language utterances as input. Further, the speech recognition system can be configured to generate a compound of specific data and 'semantic identifiers' directly as output. These semantic identifiers can be referred to as 'concepts'. The data can be marked with tags used to distinguish different kinds of data. The semantic identifiers or concepts can be represented by concept codes. The tags and the concept codes can be defined during a preparation/training phase of the system and can be chosen independently of the language used in the application.

In particular, in multilingual applications, it is convenient to choose concept codes having a common part in a unique language, and specific parts to represent the specific language. For example, a common code for representing the concept of querying can be 'QUERY' associated with a specific code 'EN' for English, 'SP' for Spanish, etc. Accordingly, a final function relevant to the application can be operated. Further, an appropriate set of answers can be selected simultaneously.

The concepts and the data can be decoded from the utterance of one or more words. The concept codes and the data tags can be as simple and short or as complex and long as required by the application. Moreover, a unique concept code can be associated with various combinations of words.

In particular embodiments, dummy codes can be assigned to some information of an utterance that is recognized as having secondary importance with regard to major concepts. Finally, in a preferred embodiment, a computer-implemented speech recognition method for performing Natural Language Understanding (NLU) functions, can include discretizing a user utterance into a plurality of basic speech units wherein the user utterance can be a sequence of words in the form of a query or a command. The plurality of basic speech units can be matched against a plurality of combinations of items wherein each item can be tagged data or a concept code. The most likely combination of items representative of the user utterance can be generated.

Preferably the matching step can include an initial first step of matching the basic speech units against a vocabulary of items. The vocabulary can be a collection of individual items defined during a preparatory/training phase of the system. Also, the combination of items can be selected valid combinations of items defined during the preparatory/training phase of the system.

Novel features believed to be characteristic of this invention are set forth in the appended claims. The invention itself, however, as well as these and other related objects and advantages thereof, will be best understood with reference to the following detailed description to be read in conjunction with the accompanying drawings.

BRIEF DESCRIPTION OF THE DRAWINGS

There are shown in the drawings, embodiments which are presently preferred, it being understood, however, that the invention is not so limited to the precise arrangements and instrumentalities shown.

DETAILED DESCRIPTION OF THE INVENTION

The method of the present invention is based, at least in part, from two observations. The first observation being that when a speech recognition system is used in a dictation application, the basic items used usually are the words contained in the user utterance. On the contrary, with the conceptual speech recognition system of the present invention, the important issues are the concepts and the data involved in the utterance, not the discrete words used to express those concepts. The second observation is that most speech recognition systems are capable of operating with virtually any language because most, if not all, features characterizing a language (such as the pronunciation, the vocabulary, the syntax, etc.) can be defined in specific data files. One of these files can define the correspondence between the spelling of each word and its pronunciation. The present invention provides for a specific language covering the scope of the user's application where the pronunciation of each word can be exactly the same as the natural language. Moreover, the spellings of the words can be codes representing concepts and tags representing data. From this representation, an appropriate function can be selected and operated to execute a command or respond to a user question.

Before describing the system of the present invention, the new language description is illustrated using three basic user utterances. A first utterance type can be in the form of a query such as "Please, give me the phone number of Pedro Romero". With the conceptual analyzis, the term "Please" can be identified as a dummy word. The expression "Give me the phone number of" can be treated as a semantic identifier and can be recognized by a concept code "QUERY" or "QUERY-EN" to indicate the English language in a multilingual application. Finally the combination "Pedro Romero" can be analyzed as data and can be, for example, tagged as: "Pedro__fn Romero__In" (where the tag__fn means that Pedro is a first name and the tag__In means that Romero is a last name).

A second utterance type can be in the form of a command such as: "Please, transfer me to him". This sentence contains no data. Rather, the expression "Transfer me to him" is a semantic identifier that can be recognized by a concept code "DIAL" or "DIAL-EN" for an English application.

A third utterance type can be isolated data such as "Pedro Romero". This expression can be interpreted as a command utterance where the system understands "I want to speak to 'Pedro Romero'". As will be discussed later in further detail, in such cases the speech recognition system can tag the utterance as "Pedro__fn Romero__In". A presumed concept code ("DIAL" in this example) for the "silent" semantic identifier "I want to speak to" can be added by a Target Function Identification Module (TFIM).

Figure 1:
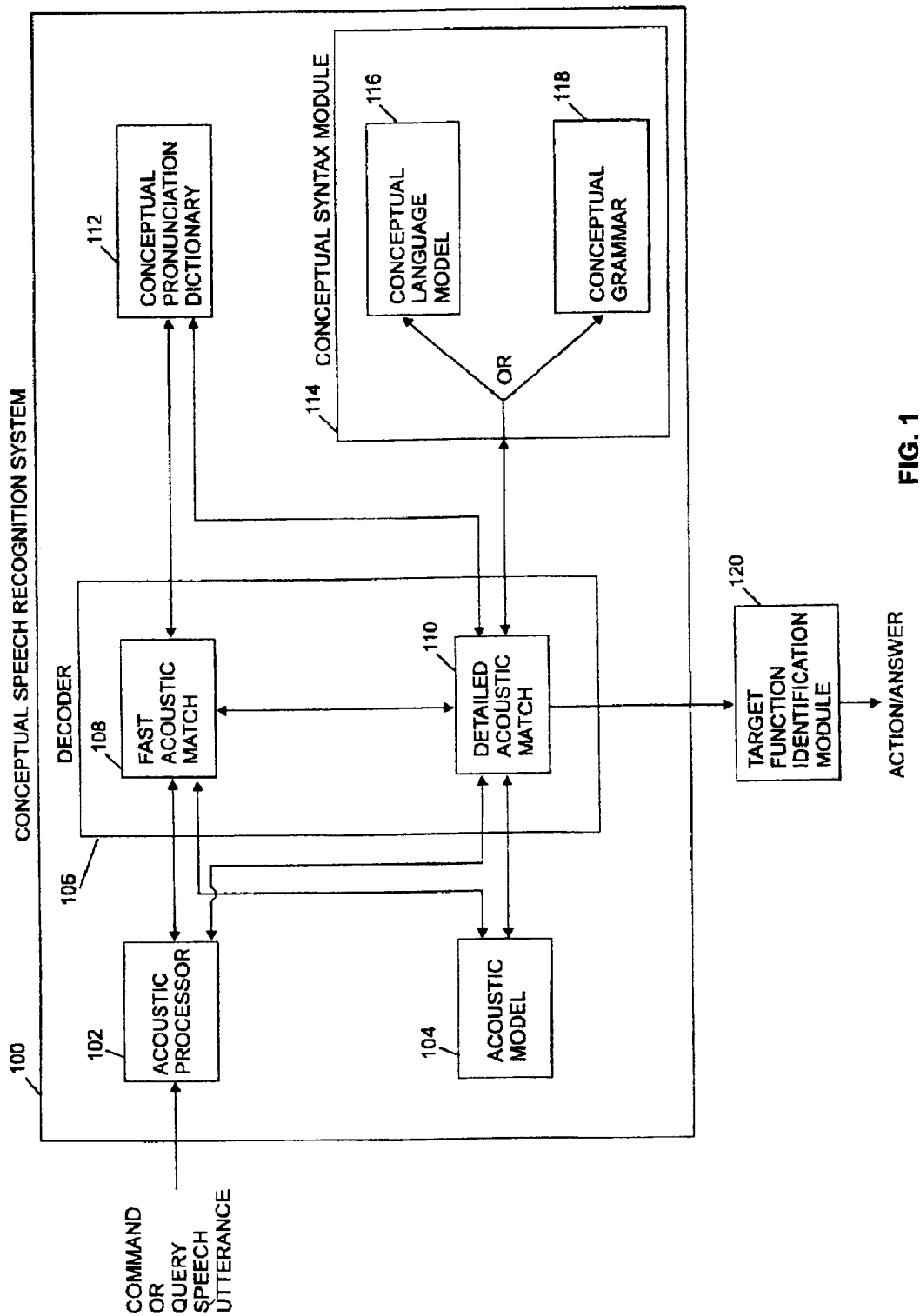
FIG. 1 is a block diagram of an exemplary speech recognition system according to the present invention.

FIG. 1 is a block diagram of an exemplary conceptual speech recognition system 100 according to a preferred embodiment of the present invention. The speech recognition system of FIG. 1 is shown operatively coupled to an application-specific TFIM 120. The conceptual speech recognition system 100 can include an acoustic processor 102 and an acoustic model 104, each being operatively coupled to a fast acoustic match 108 and a detailed acoustic match 110. The fast acoustic match 108 and detailed acoustic match 110, which are operatively coupled to each other, can be collectively referred to as a decoder 106. A conceptual pronunciation dictionary 112 and a conceptual syntax module 114 each can be operatively coupled to both the fast acoustic match 108 and the detailed acoustic match 110. Depending on the application, the conceptual syntax module 114 can be implemented either as a conceptual language model 116 or as a conceptual grammar 118.

It is to be appreciated that the present invention can be used with any speech recognition system using a conceptual language model or conceptual grammar technology, and is not in any way limited to use with, or dependent on, any details or methodologies of any particular speech recognition arrangement. For instance, generalized speech recognition systems such as the commercially available large vocabulary Via Voice system from International Business Machines Corporation can be adapted to permit and/or perform conceptual speech recognition functions in accordance with the invention. In any case, it should be understood that the elements illustrated in FIG. 1 can be implemented in various forms of hardware, software, or combinations thereof. As such, the main recognition elements (e.g., acoustic model 104, fast acoustic match 108, detailed acoustic match 110, conceptual pronunciation dictionary 112, and conceptual syntax module 114) can be implemented in software on one or more appropriately programmed general purpose digital computers. Each general purpose digital computer can contain, for example, a central processing unit (CPU) operatively coupled to an associated system memory, such as RAM, ROM, and/or a mass storage device, via a computer interface bus. Accordingly, the software modules performing the functions described herein can be stored in ROM or mass storage and can be loaded into RAM and executed by the CPU. As a result, FIG. 1 can be considered to include a suitable and preferred processor architecture for practicing the invention which can be achieved by programming the one or more general purpose processors. Of course, special purpose processors can be employed to implement the invention. Given the teachings of the invention provided herein, one of ordinary skill in the related art will be able to contemplate these and similar implementations of the elements of the invention.

A brief explanation of the functionality of the components of the conceptual speech recognition system 100 will now be given. The acoustic processor 102 can receive speech (a sequence of spoken words) uttered by a speaker. As is well known, the acoustic processor can generate wave forms, transduce the utterances into an electrical signal, convert the electrical signal into a digital signal representative of the uttered speech, sample the speech signal and partition the signal into overlapping frames so that each frame can be discretely processed by the remainder of the system. The output signal of the acoustic processor 102 can be a combination of feature vectors from the input utterance and labels (or phonemes) from the feature vectors. The labels, in a general sense, can be considered to identify a phoneme, a phoneme being the basic unit of an utterance.

The speech recognition process is constrained by the acoustic model 104 which corresponds to the phonemes employed in system 100, the conceptual pronunciation dictionary 112, and the conceptual syntax module 114. The conceptual pronunciation dictionary 112 can define the pronunciation of every concept code and every tagged data (also called the items). Preferably, the conceptual pronunciation dictionary 112 can be a file containing a list of the items used wherein each item can be followed by the phonemes associated with its pronunciation. The conceptual syntax module 114 can specify the allowable combinations of items, and can be implemented as a conceptual language model 116 or as a conceptual grammar 118.

Generally, in speech recognition systems, the collection of words that the system is able to recognize is contained in a file called a vocabulary. In the system of the invention, the speech recognition system does not recognize the uttered words, but rather the "concepts" and "data". Thus, within this invention, the vocabulary is not as in the prior art systems, a list of words, but a list of "items" defining "concept codes" and "tagged data".

The output of acoustic processor 102 (a string of labels identifying a corresponding sound type) is input to decoder 106 including the fast acoustic match 108 and the detailed acoustic match 110. The object of the fast acoustic match 108 is to compare a string of incoming labels to the items stored in the conceptual vocabulary. The fast acoustic match initially recognizes items in the incoming labels and performs a reduction process to reduce the number of recognized items that require further processing. Preferably, the fast acoustic match is based on probabilistic finite state machines. Examples of probabilistic finite state machines, which are well known in the art, can be Hidden Markov Models (HMMs). The candidate items can be selected when acoustically similar to the stored items. Accordingly, a fast match candidate items list can be produced from the fast acoustic match process.

Once the fast match reduces the number of candidate items, the fast match candidate item list can be input to the detailed acoustic match module. The detailed acoustic match module can determine the contextual likelihood of each candidate item, preferably based on existing tri-grams in relation to the conceptual syntax module. Preferably, the detailed acoustic match examines those items from the fast match candidate items list which have a reasonable likelihood of being the spoken item based on either the conceptual language model computation or the conceptual grammar. After the detailed match comparison, the conceptual syntax module is, preferably, again invoked to compute the likelihood of a segment of acoustics given the conceptual language model. The decoder of the present invention—using information derived from the fast matching, detailed matching, and applying the conceptual language model—is designed to determine the most likely path, or sequence of items for a string of generated labels.

The output of decoder 106 is then a reduced list of decoded items resulting from both processes of the fast and the detailed acoustic match modules. The decoded items output from the acoustic decoder 106 can be provided to the application-specific TFIM 120 which can execute the function corresponding to the decoded output. It is to be understood that the application-specific TFIM 120 can be any system that employs decoded speech signals as input. For example, the application-specific TFIM 120 can be a telephone modem system whereby the spoken utterances received by the conceptual speech recognition system 100 represent concepts and data to be electronically forwarded to a remote location. The recognized concepts and data can correspond to a command from a housewife and the remote location can be a home computer. Of course, the above application is merely an example, and as such, the present invention is not intended to be so limited.

A more detailed explanation of the functionality of some of the components of the conceptual speech recognition system 100 is now given. The acoustic model 104 is built and trained by analyzing speech samples of hundreds of speakers. The model contains a collection of acoustic prototypes. Each prototype can correspond to a gaussian distribution of a set of feature vectors associated with a phoneme. When a segment of a speech is input to the conceptual speech recognition system 100, the acoustic processor 102 examines the uttered speech in successive time intervals and a label is assigned to the interval based on a prototype of the acoustic model which is the closest. The closest prototype is determined by different measures of the feature vectors of the input segment speech. That is, based on the feature vector values generated during a particular interval for example, one acoustic prototype from the set of acoustic prototypes included in the acoustic model can be selected as being the closest.

In a preferred embodiment, the conceptual pronunciation dictionary 112 can be implemented as a table of items (concepts and data) corresponding to an application of interest (e.g., a conversational name dialer, a system for tourist information, a system for hotel information, etc.). Each item (concept or datum) in the dictionary vocabulary can be represented by a sequence of phonemes which are combined to form the pronunciation of the item. This sequence of phonemes is generally referred to as the baseform of an item (concept or a datum).

The conceptual language model 116 which can be one implementation of the conceptual syntax module 114 can be built and trained by analyzing a large conceptual corpus as will be described in greater detail with reference to FIG. 2. The conceptual language model can include a collection of conditional probabilities corresponding to the combination of items in the vocabulary. The function of the conceptual language model is to express rules or restrictions as to the way the items are to be combined to form sentences. Preferably, the conceptual language model is an n-gram model which makes the assumption that the a-priori probability of an item sequence can be decomposed into conditional probabilities of each item given the n items preceding it. In the context of n-gram language models, a trigram is a string of three consecutive items (denoted by i1, i2, and i3). Similarly, a bigram is a string of two consecutive items, and a unigram is a single item. The conditional probability of the trigram model can be expressed as Prob(i3|i2|i1).

An alternative implementation of the conceptual syntax module 114 can be a conceptual grammar 118 designed to accept each valid combination of concepts and/or data contained in a conceptual corpus which will be discussed with reference to FIG. 2.

Before decoder 106 is used in a real application and performs the utterance decoding process by using the feature vector signals and labels provided by acoustic processor 102, the acoustic model 104 and the conceptual language model 116 need to be trained. The parameters (probabilities) of both these models generally can be estimated using training data from the application of interest. In order to train the acoustic model 104, acoustic training data can be provided by a user of the system, as well as a transcription representative of the training data. The voices of many people can be recorded. For example, these people can speak in an environment similar to the environment where the system will be used and the recorded sentences can be similar to the sentences that the system will have to recognize. These sentences can be transcribed into text to make possible the association between the words used and how these words have been uttered. A statistical process can extract the required information. The transcription can be input directly to decoder 106 as text.

Further, in order to train the conceptual language model, a collection of sentences typical of an application domain can be composed and transcribed into a text provided to the decoder. These sentences must be composed of valid sequences of items (concepts and data).

Preferably, a trigram language model, as is well known to those skilled in the art, is trained using a transcription of a large corpus of text. The corpus can include sentences. The training involves inputting the sentences and determining statistics for each item (concept or datum) model in a manner which enhances the probability of the correct item relative to the probabilities associated with other items. Such training provides counts for all trigrams, bigrams and unigrams identified in the conceptual corpus.

Figure 2:
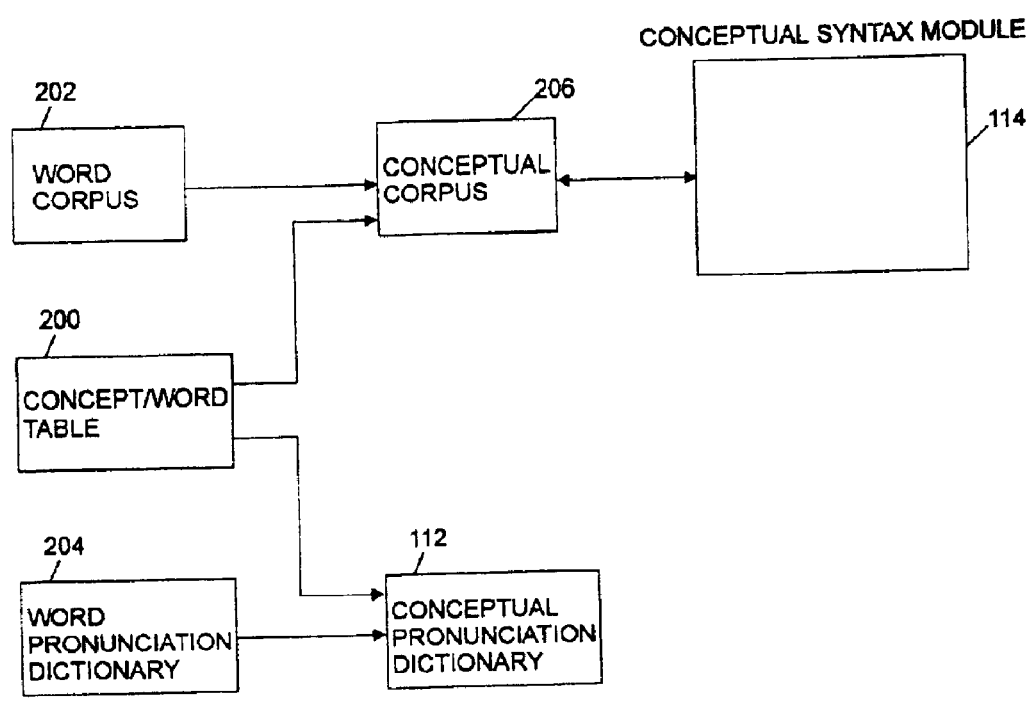
FIG. 2 is a block diagram of exemplary elements involved in the generation of a conceptual pronunciation dictionary and a conceptual syntax module.

FIG. 2 is a block diagram of the elements involved in the generation of the conceptual pronunciation dictionary 112 and the conceptual syntax module 114. Three units, a concept/word table 200, a word corpus 202, and a word pronunciation dictionary 204 are used to define a specific application.

The concept/word table 200 can include concepts defined for possible combinations of words. The word corpus 202 can include real sentences that should be recognized. The word pronunciation dictionary 204 can include sequences of phonemes reflecting the pronunciations of words contained in the word corpus. A conceptual corpus 206 can be generated from the combination of the concepts/words contained in the concept/word table 200 with the words contained in the word corpus 202 by performing every possible translation defined in the concept/word table 200. As mentioned, the conceptual syntax module which uses the conceptual corpus can be in the form of a conceptual language model 116 or a conceptual grammar 118.

The conceptual pronunciation dictionary 112 can be generated from the combination of the concept/word table 200 with the word pronunciation dictionary 204. The conceptual pronunciation dictionary 112 can be obtained by replacing every word of the concept word table 200 by its corresponding pronunciation stored in the word pronunciation dictionary 204. Those skilled in the art will recognize, and thereby adapt the system to the case where the pronunciation of a concatenation of words does not correspond to the concatenation of the different pronunciations of the words.

Figure 3:
FIG. 3 is a block diagram of exemplary elements involved in the generation of the target function identification module.

Referring to FIG. 3, a block diagram of the elements involved in the generation of the TFIM 120 is described. A function/concept table 300 can be built to store the functions to be executed in relation to every possible combination of concepts. The TFIM 120 can be an algorithm unit which performs the actions defined in the function/concept table 30. The TFIM 120 can check the decoder 106 output under specific conditions. A condition can be a combination of concept codes. For example, if in a decoded sentence the concept codes "QUERY" and "PHONE" are identified, the TFIM 120 can execute the function "QUERY-PHONE-FUNCTION" passing the datum "NAME" as an argument in the call.

When a specific condition is identified, the appropriate function can be called by TFIM 120 from the function/concept table 300 and run using the tagged data output from decoder 106. The TFIM 120 knows every relevant concept and data involved in the sentence. Accordingly, it can infer the global meaning using simple rules that can be implemented easily at a high level programming language, especially when the language provides built-in pattern matching and string functions. Additionally, this module can perform a verification of the integrity and validity of the concepts and data recognized, so it can reject incompatible or uncertain combinations, thereby improving the application efficiency.

The method of the present invention requires that: a) uttered sentences express at least a concept and data, or any sequential combination of both; b) concepts or data must be uttered as a continuous string of words; and c) it should be possible to foresee alternative phrases which can be used to express relevant concepts and data. Despite these conditions, the proposed method can be used as a general application. The method can be used for speech recognition software based on grammars as well as language models. In any case, the grammars or the corpus for training the language model must be defined using the selected codes for concepts and data. In the same way, this method can be used in any application where the voice is picked up by a microphone as well as by a phone.

The method of the present invention has been implemented to demonstrate its validity. A prototype was developed based on a telephony application already developed according to the conventional approach. The following paragraphs contain a brief description of both the traditional application (A) and the prototype application using the method of the present invention (B).

A) The original application was started from a telephony application in Spanish called Conversational Name dialer which was developed by International Business Machines Corporation. Corresponding applications in German, French, and English also were developed using the traditional approach as described below. The Spanish version was installed on an IBM Personal Computer 300 PL equipped with a telephony adapter Dialogic D/41ESC. The application knew phone numbers of some 4,000 Spanish International Business Machines Corporation employees and was designed to answer calls from users asking for the phone number of an employee or requesting to transfer a call to one of them.

Because the application is designed for use in a particular speaking environment, one of the main features of this application is that users need no special knowledge about how to use the application. Specifically, the application is designed to understand and to answer sentences in a manner that is similar to the way in which people communicate. For example, the user can address the application using formal or informal expressions, such as beginning a sentence with a greeting like "hello", "good morning", "good afternoon", etc. Alternatively, the user optionally can identify him or herself ("I'm Antonio García from IBM Madrid"). Still, the user can address the application using very short sentences or using different polite expressions.

The application was able to answer user questions and to establish dialogues when the request had some degree of ambiguity. The application utilized a text-to-speech (TTS) module to synthesize voice responses. For example, if the user asked "Give me the phone number of Fernández" the application answered something like "There are many people so called, let me know some additional information". Then the user could answer with the first name and/or the location where the person works, whether the employee is male or female, etc. This feature was implemented through a Dialog Manager (DM) module that provides the appropriate target function. The speech recognition task used a language model based on words. The model was obtained from a corpus having sentences the users could use. The operations to prepare the corpus were:

1. to collect some 400 different sentences used within this environment;
2. to select the elementary phrases (fragments) contained in those sentences;
3. to generate new sentences obtained by mixing the fragments in valid combinations;
4. to select words contained in the phone database (about 7,000 first names, last names, cities, and countries); and
5. to generate new sentences from the previous list using the words selected from the phoneme database.

B) The prototype application using the method of the present invention was developed from the original application as described above. This was performed by replacing the speech recognition system by a conceptual speech recognition system that directly recognizes concepts and data from a user utterance. In order to prepare the new conceptual speech recognition configuration, an analysis of the original word corpus was performed. This lead to the generation of 58 classes of items (concepts, codes, and tags) which can represent every sentence in the corpus in an alternative way. Every item was defined by a set of words and/or phrases having a similar meaning or a similar role in the sentences. A conceptual corpus was generated modifying the sentences by replacing every word or phrase with the corresponding concept code and replacing every data with the corresponding tagged data. Within those 58 classes, 44 represented concepts codes and 14 represented tags.

The following table is an extract of some of the 44 concept codes of the prototype application and alternative sentences:

| Concept Codes | Alternative Expressions |
| --- | --- |
| HELLO | hello - good morning - good afternoon - good night - hello good morning - hello good afternoon - hello good night - . . . |
| POLITE | please |
| QUESTION | what's - I'm calling to ask - I want to know - I want to confirm - I'd like to know - I'd like to confirm - . . . |
| PHONE | the number of - the phone number of - the phone of - the extension number of - . . . |
| LOCATION | from - he lives in - she lives in - he works in - she works in - . . . |

The following table is an extract of some of the 14 tags for the prototype application:

| Data | Tag | Tagged Data |
| --- | --- | --- |
| Pedro Romero | FIRSTNAMELASTNAME | Pedro(FIRSTNAME)-Romero(LASTNAME)-Pedro(FIRSTNAME)Romero(LASTNAME) |
| Maria Fernandez | FIRSTNAMELASTNAME | Maria(FIRSTNAME)-Fernández(LASTNAME)-Maria(FIRSTNAME)Fernández(LASTNAME) |
| Madrid | CITY | Madrid (CITY) |

The following list shows some of the sentences generated for the prototype conceptual corpus:
1. HELLO QUESTION PHONE Pedro(FIRSTNAME) POLITE.
2. HELLO QUESTION PHONE Maria(FIRSTNAME)Fernández (LASTNAME) POLITE.
3. QUESTION PHONE Pedro (FIRSTNAME)Romero (LASTNAME) POLITE.
4. PHONE Pedro (FIRSTNAME)Romero(LASTNAME).
5. PHONE DUMMY Maria(FIRSTNAME)Fernández(LASTNAME).
6. HELLO QUESTION PHONE Pedro(FIRSTNAME) LOCATION Madrid(CITY) POLITE.
7. QUESTION DUMMY PHONE Pedro(FIRSTNAME) Romero(LASTNAME) DUMMY LOCATION Sevilla (CITY).
8. PHONE Maria(FIRSTNAME)Fernández(LASTNAME) DUMMY LOCATION Sevilla(CITY).

The invention can be embodied in other specific forms without departing from the spirit or essential attributes thereof, and accordingly, reference should be had to the following claims, rather than to the foregoing specification, as indicating the scope of the invention.

What is claimed is:

1. A computer implemented speech recognition method for performing Natural Language Understanding (NLU) functions, comprising the steps of:
   (a) converting a user utterance directly into a plurality of basic speech units without convening the utterance into a sequence of textually represented words, said user utterance being a sequence of words expressing a query or a command;
   (b) matching said plurality of basic speech units against a plurality of combinations of items, wherein each item is tagged data or is a concept code; and
   (c) generating a combination of items likely to be representative of said user utterance.

2. The method of claim 1, said step (b) further comprising:
   (d) a first step of matching said plurality of basic speech units against a vocabulary of items to generate a first list of items likely to be representative of said user utterance.

3. The method of claim 2, wherein said step (d) is performed using Hidden Markov Models.

4. The method of claim 2, said step (b) further comprising:
   (e) a second step of matching said first list of items against said plurality of combinations of items to generate said combination of items likely, to be representative of said user utterance in said step (c).

5. The method of claim 4, wherein said step (e) is processed using a conceptual language model.

6. The method of claim 5, wherein said conceptual language model is an n-gram conceptual language model.

7. The method of claim 6, further comprising an initial step of training said conceptual language model.

8. The method of claim 4, wherein said step (c) is processed using a conceptual grammar.

9. The method of claim 2, further comprising:
   a training step defining said vocabulary of items of said step (d).

10. The method of claim 1, further comprising:
    defining said plurality of combinations of items of said step (c) in a training step.

11. The method of claim 9, further comprising:
    defining said plurality of combinations of items of said step (c) in a training step.

12. The method of claim 1, further comprising:
    storing a set of prototype acoustic models obtained from a training phase, wherein each said acoustic model represents one or more possible basic speech units of an utterance of a word.

13. The method of claim 12, further comprising:
    assigning one of said acoustic models to each said basic speech unit.

14. The method of claim 1, wherein said user utterance is in the form of isolated data.

15. The method of claim 1, wherein said tagged data includes a plurality of segmentable data elements.

16. The method of claim 1, further comprising:
    sending said most likely combination of items to a function identification module to perform said user query or command.

17. A speech recognition system for performing Natural Language Understanding, said system comprising:
    (a) a converter, said converter directly converting a user utterance into a plurality of basic speech units without converting the utterance into a sequence of textually represented words, said user utterance being a sequence of words expressing a query or a command;

(b) a processor, said processor matching said plurality of basic speech units against a plurality of combinations of items, wherein each item is tagged data or is a concept code; and (c) a generator, said generator generating a combination of items likely to be representative of said user utterance.

18. A speech recognition system for performing Natural Language Understanding, said system comprising:

an acoustic processor, said acoustic processor for receiving a user spoken utterance and directly determining a string of labels identifying a corresponding sound of said user spoken utterance without converting the utterance into a sequence of textually represented words;

a decoder communicatively linked to said acoustic processor, said decoder determining a likely sequence of items corresponding to said determined string of labels;

a conceptual pronunciation dictionary providing said decoder with a pronunciation of said items;

a conceptual syntax module providing said decoder with a set of allowable combined items; and a target function identification module communicatively linked to said decoder, said target function identification module executing a function corresponding to said likely sequence of items.

19. The system of claim 18, wherein said decoder comprises a fast acoustic match and a detailed acoustic match.

20. The system of claim 18, wherein said conceptual syntax module comprises a conceptual language model or a conceptual grammar.

21. A machine-readable storage, having stored thereon a computer program having, a plurality of code sections executable by a machine for causing the machine to perform the steps of:

(a) converting a user utterance directly into a plurality of basic speech units without converting the utterance into a sequence of textually represented words, said user utterance being a sequence of words expressing a query or a command;

(b) matching said plurality of basic speech units against a plurality of combinations of items, wherein each item is tagged data or is a concept code; and (c) generating a combination of items likely to be representative of said user utterance.

22. The machine-readable storage of claim 21, said step (b) further comprising:

(d) a first step of matching said plurality of basic speech units against a vocabulary of terms to generate a first list of items likely to be representative of said user utterance.

23. The machine-readable storage of claim 22, wherein said step (d) is performed using Hidden Markov Models.

24. The machine-readable storage of claim 22, said step (b) further comprising:

(e) a second step of matching said first list of items against said plurality at combinations of items to generate said combination of items likely to be representative of said user utterance in said step (c).

25. The machine-readable storage of claim 24, wherein said step (e) is processed using a conceptual language model.

26. The machine-readable storage of claim 25, wherein said conceptual language model is an n-gram conceptual language model.

27. The machine-readable storage of claim 26, further comprising an initial step of training said conceptual language model.

28. The machine-readable storage of claim 24, wherein said step (c) is processed using conceptual grammar.

29. The machine-readable storage of claim 22, further comprising:

a training step defining said vocabulary of items of said step (d).

30. The machine-readable storage of claim 21, further comprising:

defining said plurality of combinations of items of said step (c) in a training step.

31. The machine-readable storage of claim 29, further comprising:

defining said plurality of combinations of items of said step (c) in a training step.

32. The machine-readable storage of claim 21, further comprising:

storing a set of prototype acoustic models obtained from a training phase, wherein each said acoustic model represents one or more possible basic speech units of an utterance of a word.

33. The machine-readable storage of claim 32, further comprising:

assigning one of said acoustic models to each said basic speech unit.

34. The machine-readable storage of claim 21, wherein said user utterance is in the form of isolated data.

35. The machine-readable storage of claim 21, wherein said tagged data includes a plurality of segmentable data elements.

36. The machine-readable storage of claim 21, further comprising:

sending said most likely combination of items to a function identification module to perform said user query or command.

* * * * *